United States Patent
Wu et al.

(10) Patent No.: US 6,701,019 B1
(45) Date of Patent: Mar. 2, 2004

(54) DETERMINING VISUALLY NOTICEABLE DIFFERENCES BETWEEN TWO IMAGES

(75) Inventors: Ping Wu, Southampton (GB); Kevin Murray, Romsey (GB); Paul Stallard, Chichester (GB)

(73) Assignee: Tandberg Television ASA, N-Lysaker (NO)

( * ) Notice: Subject to any disclaimer, the term of this patent is extended or adjusted under 35 U.S.C. 154(b) by 0 days.

(21) Appl. No.: 09/392,502

(22) Filed: Sep. 9, 1999

(30) Foreign Application Priority Data

Sep. 10, 1998 (GB) .............................. 9819648

(51) Int. Cl.[7] .............................. G06K 9/36; G06K 9/46
(52) U.S. Cl. .................................. 382/239; 375/240.02
(58) Field of Search ................................ 382/130, 181, 382/232, 234, 236, 239, 243, 248, 250, 251, 272; 375/240.02, 240.08, 240.18, 240.26

(56) References Cited

U.S. PATENT DOCUMENTS 5,517,581 A  *  5/1996  Johnston et al.
5,566,208 A  * 10/1996  Balakrishnan  ......... 375/240.05

FOREIGN PATENT DOCUMENTS

| EP | 0526201 | 2/1993 | ............. H04N/7/13 |
| EP | 0577085 | 1/1994 | ............. G06F/15/68 |
| WO | 9737322 | 10/1997 | ............. G06K/9/36 |

* cited by examiner

Primary Examiner—Timothy M. Johnson
(74) Attorney, Agent, or Firm—Douglas S. Rupert; Wildman, Harrold, Allen & Dixon LLP (57) ABSTRACT

The present invention relates to a method and apparatus for determining visually noticeable differences between two input images. A first contrast image is generated from the first input image and a second contrast image is generated from the second input image. A contrast difference image is then formed from the two contrast images. A mean absolute difference is calculated between blocks of pixels of the first and second input image. Pixels in the contrast difference image which exceed a first threshold produce a first threshold signal and if the mean absolute difference exceeds a second threshold so a second threshold signal is produced. A detection signal is produced from the threshold signals.

15 Claims, 9 Drawing Sheets

DETERMINING VISUALLY NOTICEABLE DIFFERENCES BETWEEN TWO IMAGES

The present invention relates to determining visually noticeable differences between two images. The invention has particular application to the encoding and later decoding of an image in such fields as television signal generation, compression and transmission. When encoding an original image for television transmission and display at a receiver, it is important to know how well the system for transmitting and receiving will perform in reproducing the original image. The performance of the system is related to the visually noticeable differences between the original image and the displayed image.

A number of models have already been proposed to predict whether a human observer will be able to discriminate between two images. One such visual discrimination model is known as the Sarnoff visual discrimination model. A visual discrimination model may take, as input, a pair of images and provide an output which is a map showing the probability, as a function of position on the images, that an observer would be able to detect differences between the images. The map is referred to as a JND map showing Just Noticeable Differences. This JND map can itself be presented as an image, with higher grey levels corresponding to higher probabilities of discrimination.

In an encoding algorithm to encode picture information using quantisation methods, the image fidelity should be directly proportional to the quantisation sampling density. This assumption may be erroneous with the result that encoding bits are squandered where they have little impact on the fidelity of reproduction of an image. A better method of controlling quantisation parameters is to base control on a JND map to obtain either more uniform image fidelity for a fixed bit rate of encoding or better bit rates for a desired level of fidelity.

It is an object of the present invention to improve the identification of noticeable differences between two images.

According to the present invention there is now provided a method of identifying visually noticeable differences between a first input image and a second input image, the method comprising the steps of: generating contrast images from each input image; forming a contrast difference image from the contrast images; calculating measures of the mean absolute difference in luminance between blocks of pixels of the first and second input image; selecting pixels from the said contrast difference image which exceed a first threshold so as to form a first threshold output signal; selecting measures of the said mean absolute difference which exceed a second threshold so as to form a second threshold output signal; and, producing a detection signal indicating when both the threshold signals are present.

Further according to the present invention, there is provided apparatus for identifying visually noticeable differences between a first input image and a second input image, the apparatus comprising: a generator to generate contrast images from each input image; a difference forming circuit to form a contrast difference image from the contrast images; a calculator to calculate measures of the mean absolute difference in luminance between blocks of pixels of the first and second input image; a selector to select pixels from the said contrast difference image which exceed a first threshold, so as to form a first threshold output signal, and to select measures of the said mean absolute difference which exceed a second threshold, so as to form a second threshold output signal; and, a detector to produce a detection signal indicating when both the threshold signals are present.

The detection signal is indicative of visually noticeable differences between the first input image and the second input image. Where the second input image is a compressed form of the first input image, the detection signal indicates where noticeable differences occur between them as a result of the compression. The degree of compression can thus be increased in those areas of each image where visually noticeable differences do not appear. Reference is made to our co-pending patent application No. GB 9803580.1 entitled "Determining Visually Noticeable Differences Between Two Images".

The present invention represents an improvement in the invention of the co-pending patent application.

The invention will now be described, by way of example, with reference to the accompanying drawings in which.

Figure 1:
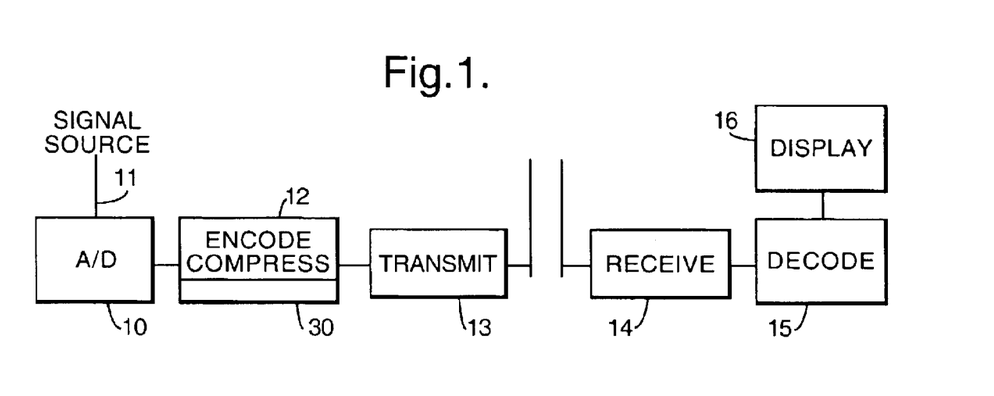
FIG. 1 shows in block diagram form a video signal transmission apparatus embodying the present invention.

FIG. 1 shows a video signal transmission apparatus including an analogue to digital converter 10 to receive an input analogue television signal 11 for conversion to a digital signal. The input digital signal is encoded and compressed in an encoder 12 and applied to a transmission circuit 13. The transmission circuit 13 broadcasts the compressed signal in conventional manner for reception by one or more receiver circuits 14. The receiver circuit 14 applies the received signal to a decoder 15 for decoding and supply to a display 16.

Figure 2:
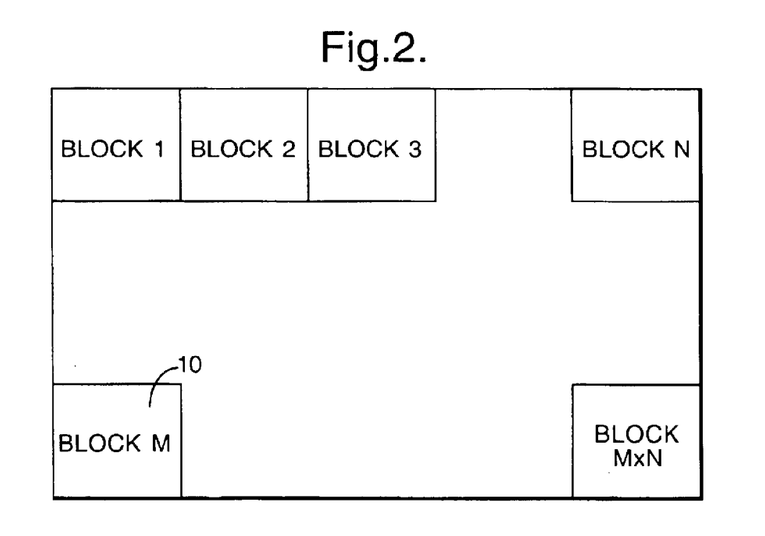
FIG. 2 shows a video signal frame transmitted by the apparatus of FIG. 1.

FIG. 2 shows a frame 10 included in the digital signal output from the encoder 12. As is well understood in the digital television art, the digital television signal includes a sequence of frames 10. Each frame consists of a matrix of pixels divided into M×N blocks of pixels.

The processes of encoding, compression, transmission and display all introduce some degree of unwanted noise into the picture information displayed by the television display 16. At the display 16, the noise may be more noticeable in some picture blocks of the image than in others. A control circuit 30 is incorporated into the encoder 12 to control the compression of the television signal so as to reduce the effect of the unwanted noise. The control circuit 30 is shown in FIGS. 3 and 4.

Figure 3:
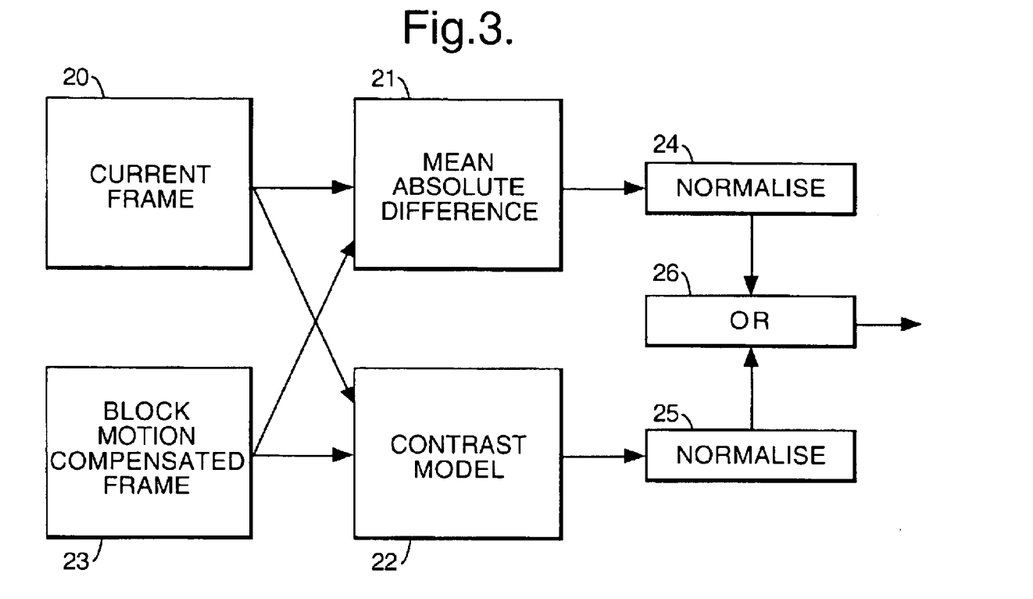
FIG. 3 shows a control circuit included in the apparatus of FIG. 1.

As seen in FIG. 3, a first current television signal frame 20 is supplied to a mean absolute difference circuit 21 and to a contrast model circuit 22. A second, block motion compensated frame 23 is supplied to the mean absolute difference circuit 21 and to the contrast model circuit 22. The outputs from the circuits 21 and 22 are normalised in circuits 24 and 25 respectively and the outputs from the normalising circuits 24 and 25 are passed to OR module 26.

Figure 4:
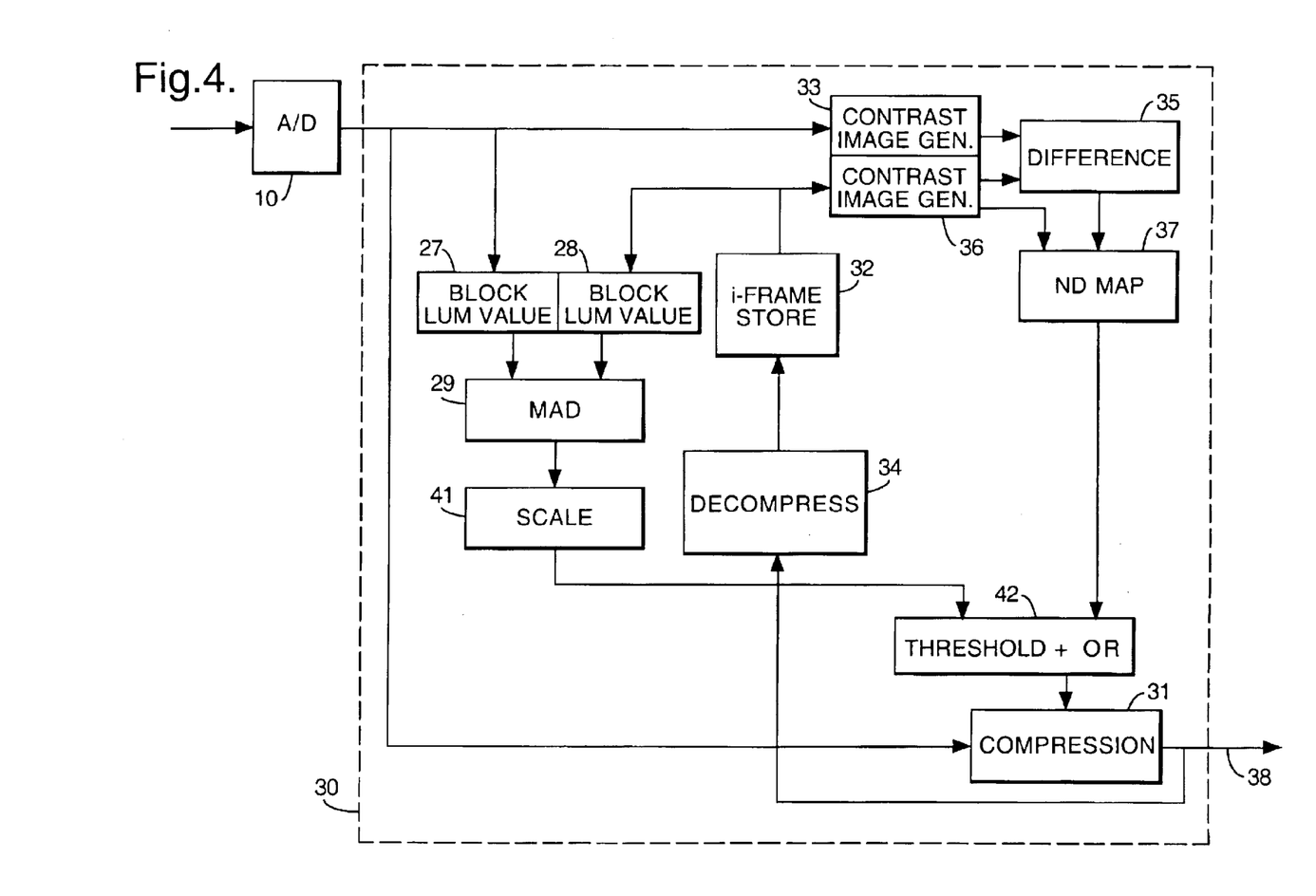
FIG. 4 shows further detail of the control circuit of FIG. 3.

Further detail of the control circuit 30 is shown in FIG. 4, which will now be described.

The digital television signal from the analogue to digital converter 10 is applied to a compression circuit 31 for compression and supply to an output terminal 38 connected to the transmission circuit 13. The digital television signal is also supplied to a contrast image generator 33. The generator 33 generates a contrast image from the pixels of each frame and applies the contrast image to a difference circuit 35.

The compressed signal at the output terminal 38 is supplied to a decompression circuit 34 where the signal is subject to decompression and the resulting decompressed signal is passed to a 1—frame store 32. The output of the 1—frame store 32 is applied to a second contrast image generator 36. The difference circuit 35 receives the contrast images from the two contrast image generators and produces a contrast difference image. The contrast difference image is mapped in a ND (noticeable difference) map circuit 37. The map circuit 37 applies an output signal to a threshold circuit 42.

The digital television signal from the analogue to digital converter 10 is applied to a block luminance value circuit 27 which determines the luminance value of blocks of pixels in the television signal. The output of the 1—frame store is passed to a second block luminance value circuit 28 which determines the luminance value of blocks of pixels in the decompressed signal. The mean average difference circuit 29 receives the luminance values from the circuits 27 and 28 to produce a mean average difference. The mean average difference is scaled in the scaling circuit 41 and supplied to the threshold circuit 42. The threshold circuit 42 applies an output control signal to control the compression circuit 31.

Figure 5:
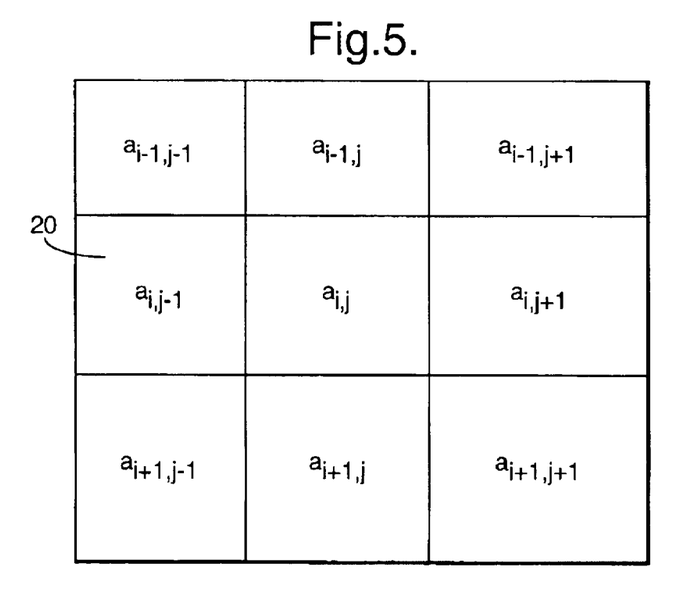
FIG. 5 shows a block of pixels that are processed by the circuit of FIGS. 3 and 4.

The operation of the control circuit shown in FIGS. 3 and 4 will now be described with reference to FIGS. 2, 5, 6 and 7. Each frame of the digital television signal applied to the contrast image generator 33 and the compression circuit 37 includes the blocks of pixels already mentioned and shown in FIG. 2. In the contrast image generator 33, each of the pixels is processed in relation to a 3×3 neighbourhood area as shown in FIG. 5. Each pixel $a_{i,j}$ is included in a 3×3 area extending from the pixel $a_{i-1,j-1}$ to the pixel $a_{i+1,j+1}$. The image generator 33 generates a contrast value $c_{i,j}$ for each pixel $a_{i,j}$ according to the relation;

$$c_{i,j} = 100 * \frac{Lmax - Lmin}{Lmax + Lmin}$$

Where Lmax is the maximum luminance value of the pixels in the 3×3 neighbourhood area and L min is the minimum luminance value of the pixels in the 3×3 neighbourhood area.

Figure 6:
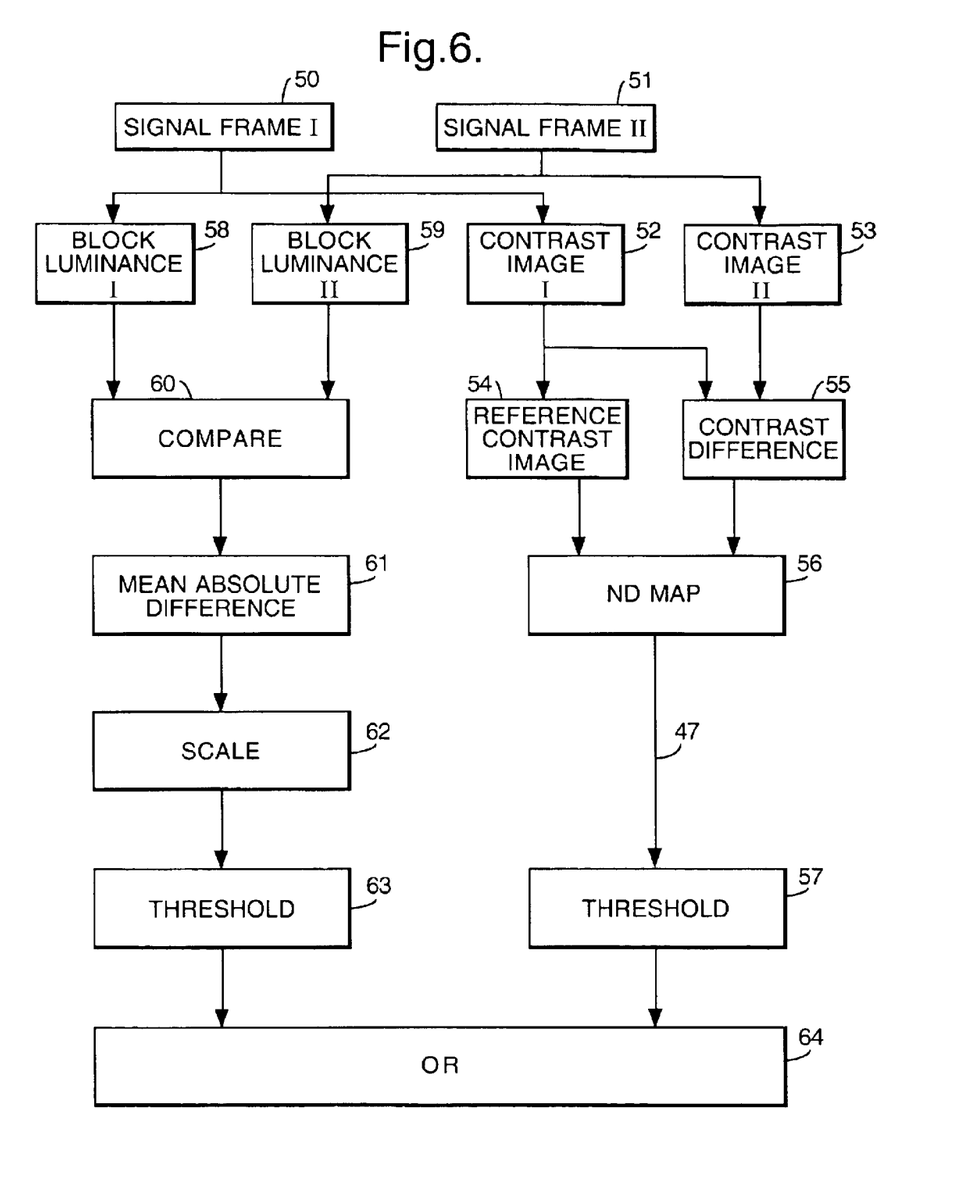
FIG. 6 shows a block diagram of steps used in processing signals in the circuit of FIGS. 3 and 4 to provide a map of just noticeable differences between two image frames.

Referring to FIG. 6, a signal frame I of the digital television signal is received by the contrast image generator 33 in step 50 at the same time that a signal frame II is received by the contrast image generator 36 in step 51. The signal frame I is converted in step 52 into a contrast image I as already described above with reference to FIG. 4. The signal frame II is a reconstruction of the television signal frame which precedes the signal frame I. The signal frame II is derived by the decompression circuit 34 and supplied to the 1—frame store 32. The signal frame II, supplied in step 51, is converted in step 53 into a contrast image II by the contrast image generator 36. The contrast image generator 36 uses the same process as the contrast image generator 33 to generate its contrast image.

The difference circuit 35 compares the contrast value of each pixel in the contrast image I with the contrast value of each pixel in the contrast image II. The result is a contrast difference image in which the contrast image differences for each frame are mapped in comparison with the preceding frame in the television signal. The contrast image I is applied, in step 54, to the ND map circuit 37. The contrast difference image is applied, in step 55, to the ND map circuit 37. The contrast image I is used as a reference for each pixel of the contrast difference image so as to select pixels from the contrast difference image in each frame as will be explained with reference to FIG. 7.

Figure 7:
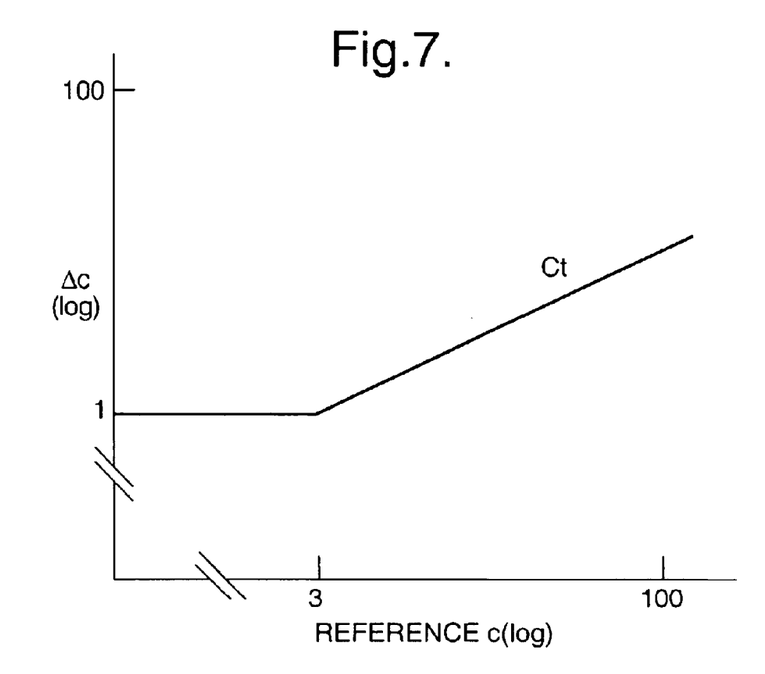
FIG. 7 shows a graph of threshold values applicable to the process steps in FIG. 6.

In FIG. 7 there is shown a threshold curve Ct plotted against a difference value Δc along one axis and a reference value C along the other axis. Each axis has a logarithmic scale.

The value Δc is the difference value of a pixel in the contrast difference image supplied by the difference circuit 35. The reference value C is the pixel value of the corresponding pixel in the reference contrast image supplied by the contrast image generator 33. It will be observed that the threshold curve Ct includes a constant portion for which ΔC approximates to 1 for values of log C between 0 and 3. For values of log C in excess of 3, the curve Ct has a gradient of 0.87.

For each pixel where the value of log ΔC exceeds the threshold Ct, a control signal output is supplied to an output terminal 47 from the ND map circuit 37. The control signal output is subjected in step 57 to a threshold operation in the threshold circuit 42 which operates on blocks of pixels in the map 37.

The signal frame I of the digital television signal is also applied in step 50 to the block luminance value circuit 27. The circuit 27 operates on blocks of pixels which are eight by eight blocks to produce in step 58 an average of the luminance values of each eight by eight block. The signal frame II is applied in step 51 to the block luminance value circuit 28. The circuit 28 operates on eight by eight blocks of pixels to produce the absolute difference pixel by pixel for the eight by eight blocks which provides 64 difference values. The mean average difference is scaled in step 62 and subjected to a threshold operation in step 63.

The steps 58 to 62 produce a mean average difference which can be expressed as:

$$MAD = \frac{1}{64} \sum_{i=0}^{7} \sum_{j=0}^{7} |L_{ij}^1 - L_{ij}^2|$$

where two blocks have luminance values
$L^1{}_{ij}$ and $L^2{}_{ij}$
$0 \leq i,j \leq 7$
and the scaling factor applied in step 62 is 1/64.

The threshold steps 57 and 63 apply a variable threshold to the signal on the line 47 from the ND map and a variable threshold to the mean average difference signal from the scaling step 62. The results of the threshold steps 57 and 63 are subjected in step 64 to an OR operation. The OR operation determines if either of the thresholds in steps 57 and 63 is exceeded. If either is exceeded, the images being compared are assumed to have no visually noticeable differences. The product of the OR step 64 is supplied to the compression circuit 31 to control the compression of the television signal from the analogue to digital converter 10.

The signal compression can thereby be varied in a selective manner to achieve a better image fidelity for a fixed bit rate of encoding in the compression circuit 31 or better bit rates for a desired level of fidelity.

Figure 8:
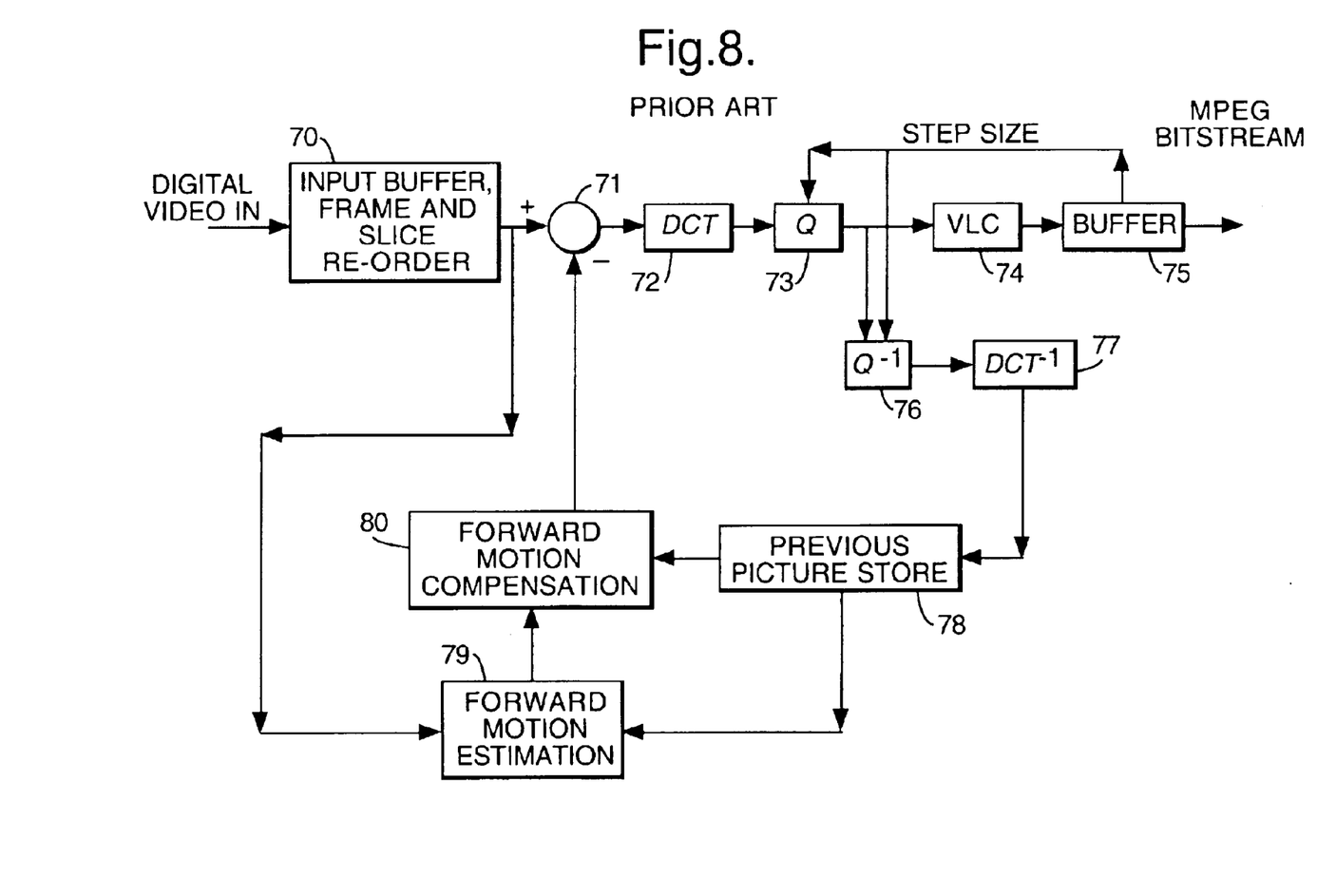
FIG. 8 shows a conventional television signal encoder apparatus.

Further details regarding the manner in which the compression may be selectively varied will now be described with reference to FIGS. 8 and 9. In FIG. 8, a conventional video encoder comprises an input buffer 70 to receive a digital video signal. The buffer 70 applies sliced and reordered picture frames to a summer 71. The summer 71 has an output connected to a discrete cosine transform circuit 72 in which a discrete cosine transform is performed on the output from the summer 71. The transform circuit 72 is connected to a quantisation circuit 73, which feeds a variable length coder 74. The variable length coder 74 supplies an output buffer 75. The output from the buffer 75 is an MPEG compressed bit stream representing the digital video signal applied to the input buffer 70.

A reverse quantisation circuit 76 receives an input from the quantisation circuit 73. The circuit 76 is connected to feed a reverse transform circuit 77, which performs a reverse discrete cosine transformation. Each frame of the input digital video signal is decompressed by the circuits 76 and 77 and applied to a frame store 78. A forward motion estimation circuit 79 derives forward motion estimation signals by comparing each frame in the store 78 with the frame at the output from the buffer 70.

A forward motion compensation circuit 80 receives the frame stored in the frame store 78 and the motion estimation signals from the circuit 79. The motion compensation circuit 80 applies motion compensation to the video signals passing through the summer 71.

Figure 9:
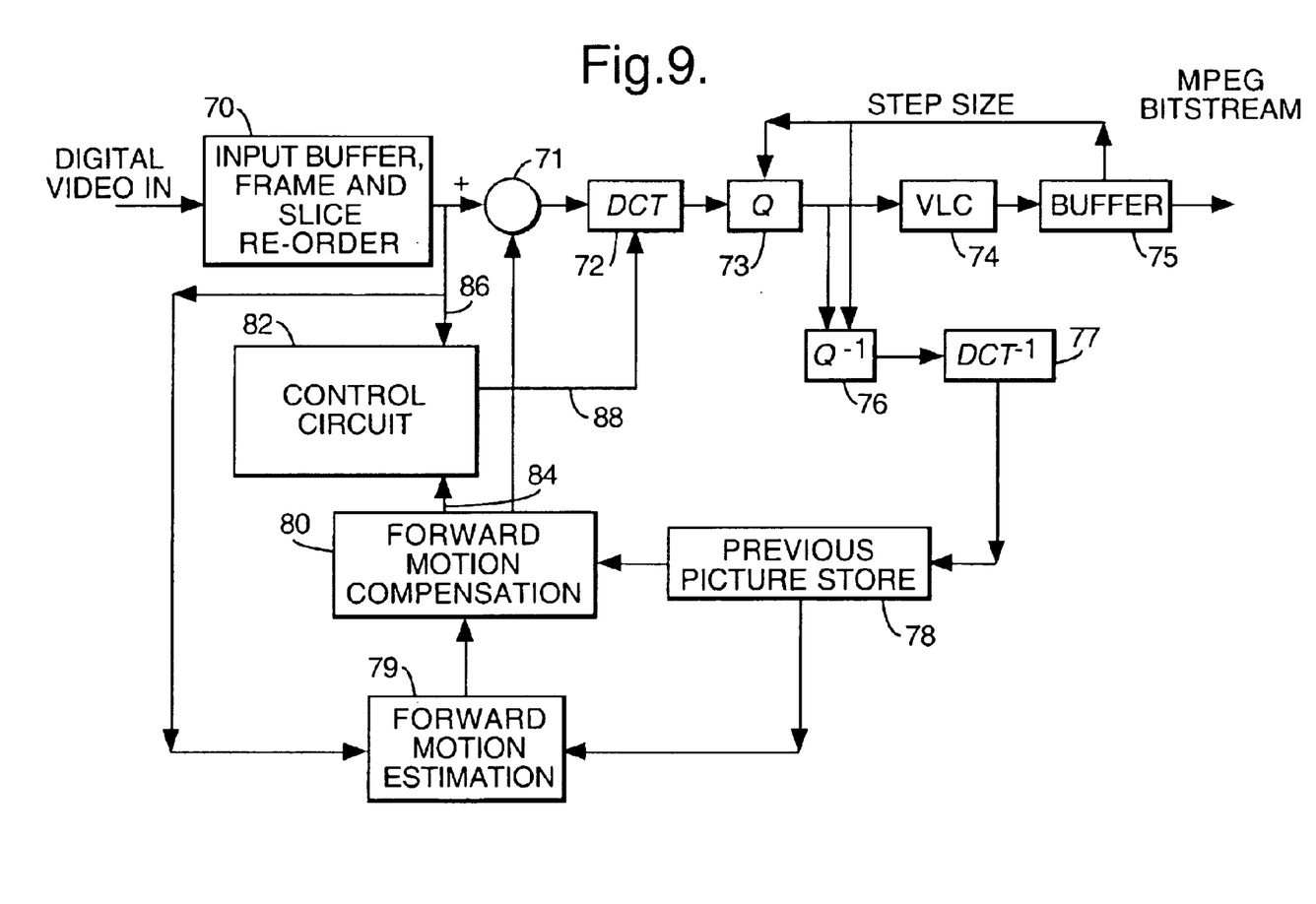
FIG. 9 shows the apparatus of FIG. 8 modified according to the invention to add a control circuit.

In FIG. 9, the apparatus of FIG. 8 is shown adapted to include a control circuit 82. The control circuit 82 receives at input 84 the decompressed and motion compensated signal generated by the circuit 80. The circuit 82 also receives at input 86 the picture information from the buffer 70 in respect of the next succeeding frame. The circuit 82 has an output terminal 88 connected to the transform circuit 72.

Figure 9A:
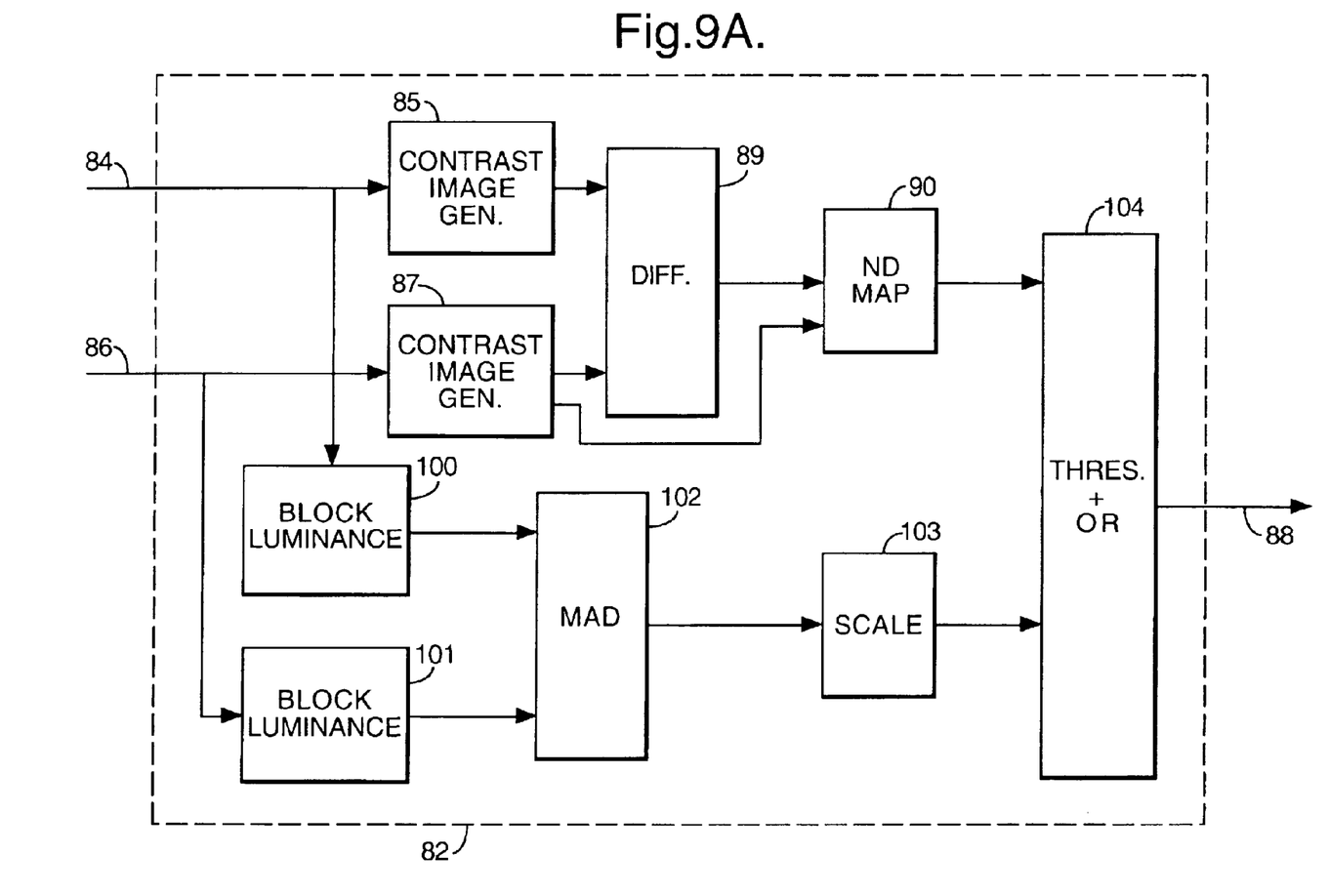
FIG. 9A shows details of the control circuit added into the apparatus of FIG. 9.

FIG. 9A shows further detail of the control circuit 82. As seen in FIG. 9A, the input terminal 84 is connected to a first contrast image generator 85 and the input terminal 86 is connected to a second contrast image generator 87. The two contrast image generators 85 and 87 correspond respectively to the two contrast image generators 33 and 36 of FIG. 4. The contrast image generators 85 and 87 generate contrast images in the same manner as the corresponding contrast image generators 33 and 36 of FIG. 4. The contrast images generated by the generators 85 and 87 are applied to a difference circuit 89, which corresponds to the difference circuit 35 in FIG. 4. The output from the difference circuit 89 is applied to a ND map circuit 90 corresponding to the map circuit 37 of FIG. 4.

The input terminals 84 and 86 are connected to first and second block luminance signal generators 100 and 101 which correspond to the circuits 27 and 28 of FIG. 4. The luminance signals from the generators 100 and 101 are applied to a mean average difference module 102 corresponding to the circuit 21 of FIG. 4. The mean average difference signal from the mean average difference module 102 is scaled by the scaler 103. The output from the ND map circuit 90 and the output from the scaler 103 are applied to a threshold and OR circuit 104 which corresponds to the threshold and OR circuit 42 of FIG. 4. The thresholds in the circuit 104 may be controlled so that they change depending on the video sequence being coded. Images that are more difficult to code at the desired bit rate should be given higher thresholds, as the level of acceptable distortion will be higher in these cases. The threshold values are thus linked to the quantisation parameter.

Figure 10:
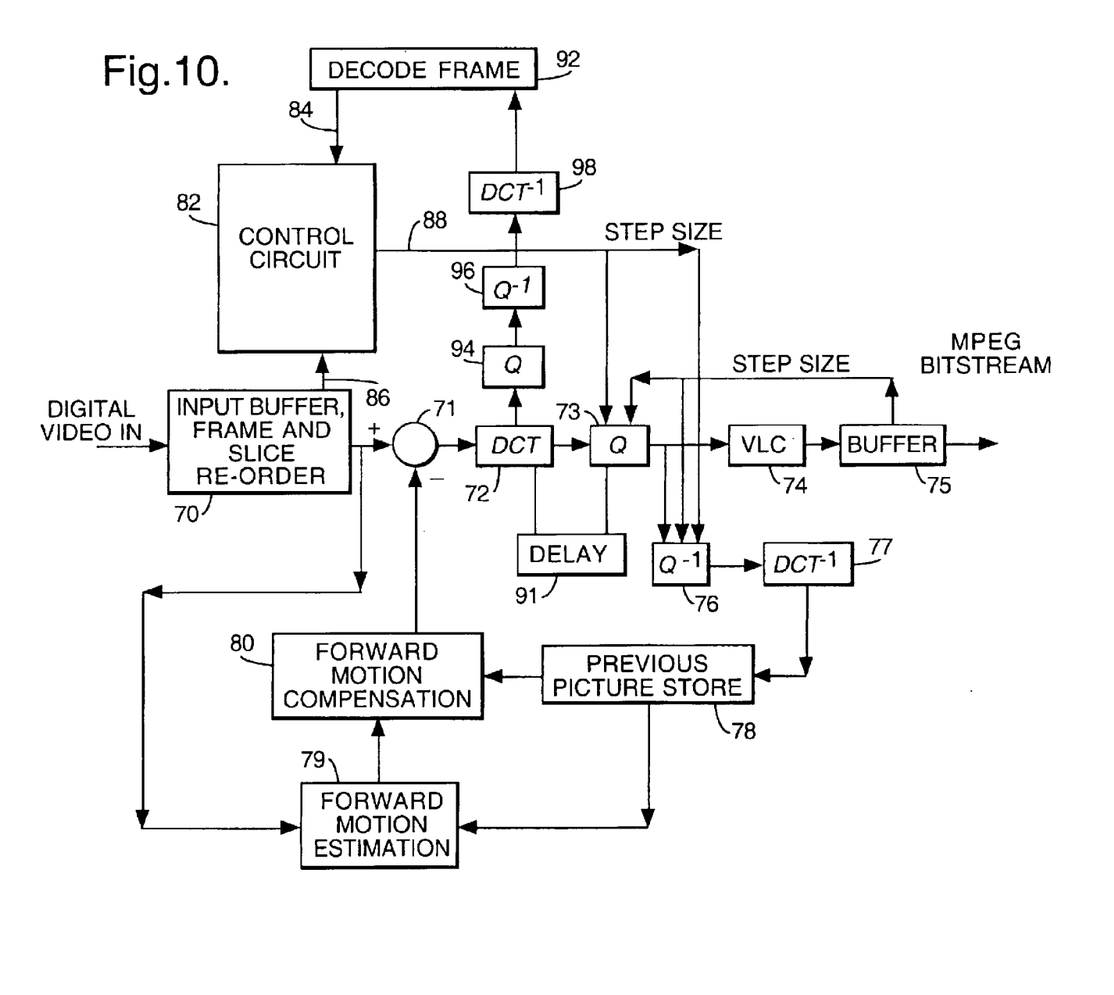
FIG. 10 shows a further television signal encoder modified to incorporate the control circuit of FIG. 9A.

The elements of the control circuit 82 operate in the same manner as the corresponding elements in the control circuit of FIG. 4 to generate control signals at the output terminal 88. The control signals are applied to control the transform circuit 72 such that DCT values are sent when either input to the circuit 104 exceeds its threshold. In FIG. 10, a second adaptation of the apparatus of FIG. 8 is shown. In this second adaptation, the quantisation circuit 73 receives the output from the transform circuit 72 by way of a delay circuit 91. The control circuit 82 has its input terminal 84 connected to a frame store 92, its input terminal 86 connected to the input buffer 70 and its output terminal 88 connected to the quantisation circuit 73 and the inverse quantisation circuit 76. A quantisation circuit 94 receives the output from the transform circuit 72 and supplies a quantised signal to an inverse quantisation circuit 96. The output from the inverse quantisation circuit is subject to an inverse DCT transformation in an inverse transform circuit 98 and is supplied to the frame store 92.

Figure 11:
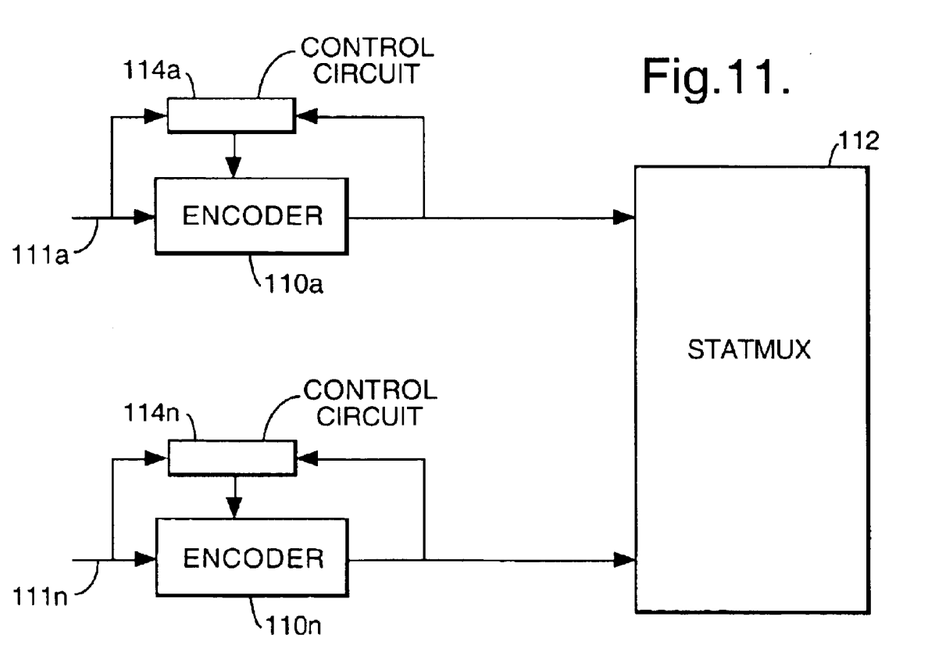
FIG. 11 shows a statistical multiplexer apparatus incorporating a plurality of the control circuits of FIG. 8A.

The control circuit 82 generates a control signal on the terminal 88 to vary the step size of the quantisation applied by the quantisation circuit 73. The thresholds in the threshold and OR circuit 104 determine the quantisation parameters and hence the image fidelity of the MPEG bitstream supplied from the output buffer 75. In FIG. 11, a series of encoders 110a to 110n each receives a digital video signal at a respective input terminal 111a to 110n. Each of the encoders 110 quantises and encodes the respective input digital signal for supply to a statistical multiplexer 112. Only two encoders are shown in FIG. 11 but it will be appreciated by those skilled in the art that multiple encoders may be linked to a common statistical multiplexer 112. The bit rate of each encoder is a function of the input digital signal and each encoder places a varying demand on the bit rate capacity of the statistical multiplexer 112. The bit rate capacity of the multiplexer 112 is shared between the encoders 110a to 110n in a known manner. Control circuits 114a to 114n are provided for controlling the encoders 110a to 110n. Each of the control circuits 114a to 114n has the same configuration and function as the control circuit shown in FIG. 4 and described above.

The control circuits 114a to 114n each control the quantisation of the respective encoder to achieve a higher bit rate for a given image fidelity. The number of encoders 110, which share the bit rate capacity of the statistical multiplexer 112, may thus be increased.

The contrast values derived by the contrast image generators 33 and 36 of FIG. 4 or the corresponding contrast image generators 85 and 86 are governed by the relation:

$$c_{i,j} = 100 * \frac{Lmax - Lmin}{Lmax + Lmin}$$

as already explained to produce the two local contrast images.

The contrast is expressed as a percentage, which requires a multiplication by 100, but this acts only to scale the contrast values. In order to simplify the calculation, a multiplication by 64 may be substituted for the multiplication by 100 so as to make the calculation easier to implement in binary circuits. A multiplication by 64 requires only a shift and prevents the need for non-integer numbers.

The relation also requires a division which may be implemented by approximating the divisor to the next power of two. The approximation requires the most significant set bit in the luminance sum to be found. Having determined the correct power of two, the division becomes a simple shift process in binary hardware.

The threshold function illustrated in FIG. 7 may be replaced by a simple linear function, which in turn can be arranged to include only one division by four (a shift). The control signal supplied by the contrast model may then be calculated as the difference, rather than the ratio, of the contrast difference and the threshold value. As a result, the contrast model calculation can be approximated as:

contrast model output=MAX (0,Δc−c/4)

This simplified function closely approximates the function shown in FIG. 7. The two functions both capture the essential property of the contrast threshold, namely that at higher background contrast values, it requires a larger change in the contrast for the change to be visible.

Whilst the invention has been described in relation to the control of television signals compressed by discrete cosine transform methods and by quantisation methods, it will be apparent that the invention may also be applied to the control of television signals compressed by other techniques such as wavelet compression.

It will be seen from the above description that the invention provides a method and apparatus which is able to identify areas in an image where visually noticeable differences occur between an original image and a reproduction of that image. The performance of the system that provides the reproduction can be derived by means of the invention and adjustment made to the system to enable the requisite image fidelity to be achieved. Thus, where the system compresses the original image, the degree of compression can be adjusted to reduce or eliminate the usually noticeable differences.

What is claimed is:

1. A method of identifying visually noticeable differences between a first input image and a second input image each including a block of pixels, the method comprising the steps of:
   generating a contrast image from each input image;
   forming a contrast difference image from the contrast images;
   calculating a mean absolute difference in luminance between blocks of pixels of the first and second input image;
   determining pixels from the said contrast difference image which exceed a first threshold so as to form a first threshold output signal;
   setting a second threshold and determining if said mean absolute difference exceeds said second threshold so as to form a second threshold output signal; and
   producing a detection signal from at least one of said first and second threshold signals.

2. A method as claimed in claim 1, comprising applying said detection signal to adaptively control compression of a television signal.

3. A method as claimed in claim 1, wherein the first and second input images each consist of a matrix of pixels within a television signal frame.

4. A method as claimed in claim 1, including the further step of deriving the second input image from the first input image by first compressing and subsequently decompressing the first input image.

5. A method as claimed in claim 4, wherein the step of deriving the second input image from the first input image comprises compressing the first input image by a discrete cosine transformation step and decompressing the compressed first input image by an inverse discrete cosine transformation step.

6. A method as claimed in claim 5, wherein the step of deriving the second input image from the first input image comprises compressing the first input image by a digital quantisation step and decompressing the compressed first input image by an inverse digital quantisation step.

7. A method as claimed in claim 5, comprising the further step of controlling the degree of compression by reference to the detection signal, so as to limit the number of visually noticeable differences between the first and second input images.

8. Apparatus for identifying visually noticeable differences between a first input image and a second input image each including a block of pixels, the apparatus comprising:
   a generator to generate a contrast image from each input image;
   a difference forming circuit to form a contrast difference image from the contrast images;
   a calculator to calculate a mean absolute difference in luminance between blocks of pixels of the first and second input image;
   first determining means to select pixels from the said contrast difference image which exceed a first threshold, so as to form a first threshold output signal;
   second threshold setting means, and second determining means to determine if said mean absolute difference which exceeds said second threshold, so as to form a second threshold output signal; and
   a detector to produce a detection signal from at least one of said first and second threshold signals.

9. Apparatus as claimed in claim 8, further comprising compression means controlled by said detection signal to adaptively control compression of a television signal.

10. Apparatus as claimed in claim 8, wherein the generator is adapted to generate the first and second contrast images from first and second input images each consisting of a matrix of pixels within a television signal frame.

11. Apparatus as claimed in claim 8, further including compression and decompression circuits adapted to derive the second input image from the first input image by first compressing and subsequently decompressing the first input image.

12. Apparatus as claimed in claim 11, wherein the compression circuit comprises means to compress the first input image by discrete cosine transformation and the decompression circuit comprises means to decompress the compressed first input image by inverse discrete cosine transformation.

13. Apparatus as claimed in claim 11, wherein the compression circuit comprises means to compress the first input image by digital quantisation and the decompression circuit comprises means to decompress the compressed first input image by inverse digital quantisation.

14. Apparatus as claimed in claim 12, further comprising control means to control the compression in the compression circuit in response to the detection signal, so as to limit the number of visually noticeable differences between the first and second input images.

15. Signal encoding and multiplexing apparatus comprising a plurality of signal encoders for encoding and compressing a respective plurality of input digital television signals to produce a corresponding plurality of encoded, compressed television signals and a statistical multiplexer to multiplex the encoded television signals, wherein each of the signal encoders includes an associated control circuit, said control circuit comprising:

- a generator to generate a contrast image from each said plurality of input digital television signals;
- a difference forming circuit to form a contrast difference image from the contrast images;
- a calculator to calculate a mean absolute difference in luminance between blocks of pixels of the first and second input image;
- first determining means to select pixels from the said contrast difference image which exceed a first threshold, so as to form a first threshold output signal;
- second threshold setting means, and second determining means to determine if said mean absolute difference which exceeds said second threshold, so as to form a second threshold output signal; and
- a detector to produce a detection signal from at least one of said first and second threshold signals to control the degree of compression applied by the associated signal encoder, so as to limit the number of visually noticeable differences between the first and second input images.

* * * * *